March 8, 1966   G. W. BECK   3,239,277
TRACTION STRUCTURE FOR MOTOR VEHICLES
Filed March 4, 1964   2 Sheets-Sheet 1

INVENTOR.
George W. Beck
BY
Hovey, Schmidt, Johnson & Hovey
ATTORNEYS.

March 8, 1966            G. W. BECK          3,239,277
TRACTION STRUCTURE FOR MOTOR VEHICLES
Filed March 4, 1964                           2 Sheets-Sheet 2
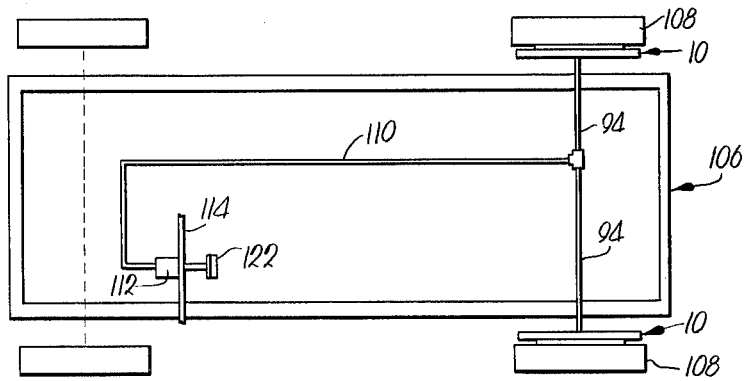
Fig.7.
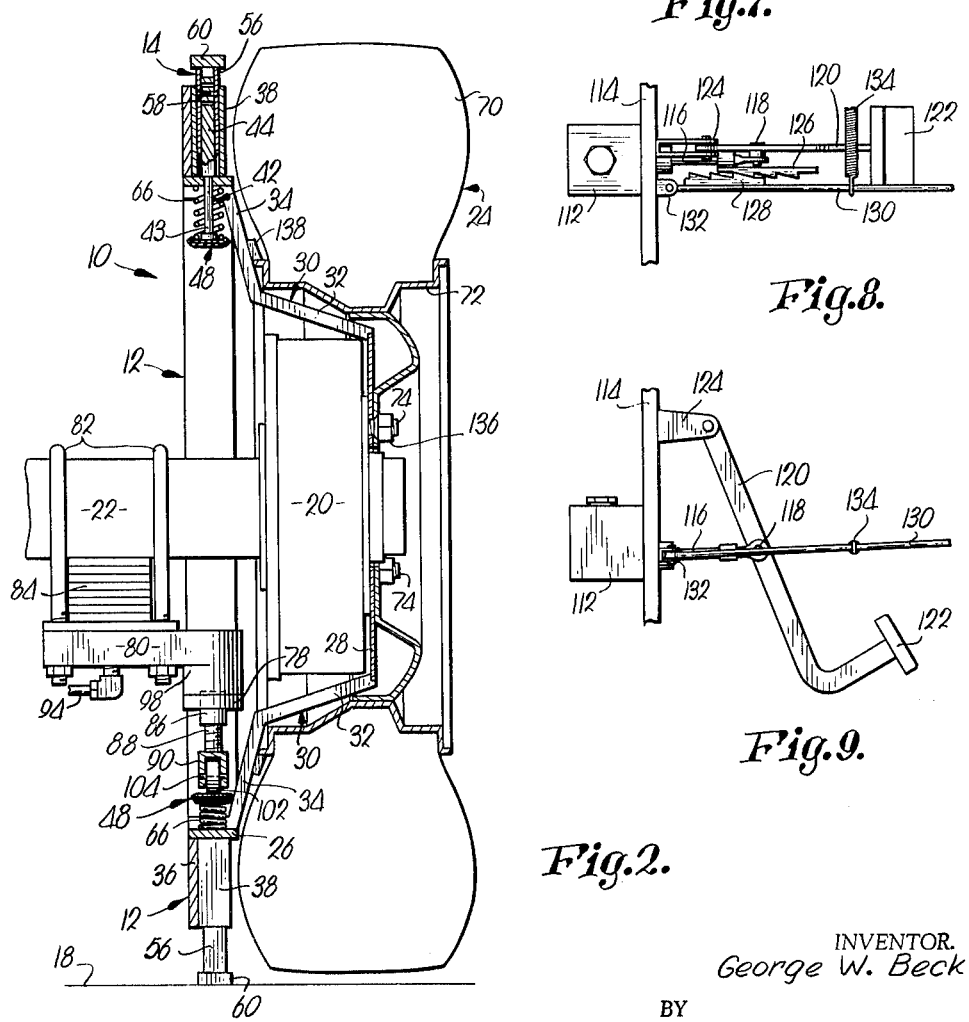
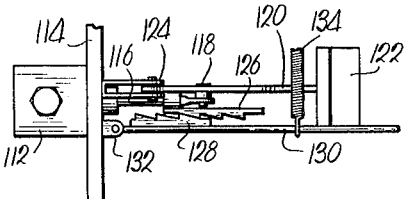
Fig.8.
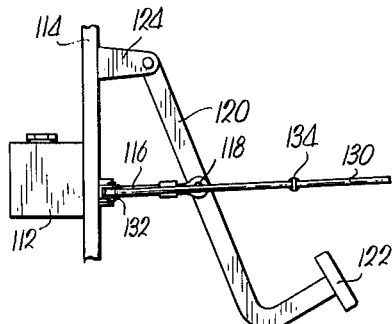
Fig.9.
Fig.2.
INVENTOR.
George W. Beck
BY
Hovey, Schmidt, Johnson & Hovey.
ATTORNEYS.

United States Patent Office 3,239,277
Patented Mar. 8, 1966

3,239,277
TRACTION STRUCTURE FOR MOTOR VEHICLES
George W. Beck, 1611 Jackson, Kansas City, Mo.
Filed Mar. 4, 1964, Ser. No. 349,442
3 Claims. (Cl. 301—47)

This invention relates to wheel structure for a vehicle, and more particularly, to a traction device which attaches to a powered vehicle adjacent a wheel thereof to provide additional traction or an additional wheel for the vehicle.

Many structures have been devised to provide additional traction for a vehicle during weather conditions of snow and ice, but all of these structures, insofar as I have been able to determine, are coupled directly to and about the outer peripheries of vehicle wheels. An example of this is the elongated, conventional tire chain which is placed over the outer periphery of a wheel and joined at its ends. Structures such as these, which must be manually secured to and removed from vehicle wheels, require considerable time and effort to place them in and remove them from operative positions and subject the person handling them to the dirt on and about the wheels. As is well known, it is especially disconcerting for a person to have to put tire chains on the wheels of his automobile during a snowstorm, for instance.

Other proposed, traction-producing structures are designed so as to be permanently secured to vehicle wheels and to be actuated by suitable tools or operated remotely from the wheels. These, however, are too complicated to be of any practical value. There are too many parts in these structures which are affected by low air temperatures, snow and ice and, as a result these structures have never been commercially accepted. A need therefore exists for a traction device which overcomes the disadvantages of conventional traction-producing equipment, but which is simple in construction and operation, provides positive traction during periods of ice and snow, can be mounted on a vehicle and left in place thereon at all times, and which can be operated remotely from its point of use.

The present invention provides a traction device which satisfies this need and overcomes the problems inherent in structures of the prior art. The invention accomplishes this by providing traction apparatus which is operated independently of the wheels of a vehicle and, as a result, can be utilized even if the wheels are useless to support or provide traction for a vehicle in the usual manner. The invention is constructed so as to be remotely operated whereby a number of traction devices made pursuant to the concepts of the invention may be utilized simultaneously at different locations on a vehicle.

The instant invention can also be utilized as a jack for supporting a vehicle so that a wheel thereof can be replaced for instance, if the tire on the wheel is flat and must be removed for repair. This obviates the use of the conventional bumper or axle jack and substantially minimizes the time and effort heretofore expended for changing a wheel.

The present invention also can be used as a wheel itself in the event a wheel adjacent thereto becomes inoperative. For instance, if the tire of the wheel is punctured and becomes flat during highway driving, the traction device will permit the vehicle to continue to be driven until a service station or like repair facility is reached. Thus, the vehicle will not be supported on the flat tire and the latter will thus remain intact and undamaged.

It is, therefore, the primary object of the present invention to provide a traction device which can be attached to a rotatable hub of a vehicle adjacent one wheel thereof and which has no structure which extends about or along the periphery of the wheel, but which operates independently thereof so that, regardless of the condition of the wheel or its traction-producing capability, the device will, when placed in operation, provide traction and support if necessary, for the vehicle.

Another object of the invention is the provision of a traction device which can be permanently secured to a vehicle and maintained thereon in an inoperative position when its use is not required without interfering with the normal operation of the vehicle so as to preclude having to expend additional time and effort to remove it from the vehicle after its use is no longer necessary.

Still another object of this invention is to provide traction apparatus of the type described which can be placed in operation almost immediately and can be disposed at a location remote from its point of use, whereby it can be operated from the driver's seat of a vehicle immediately upon notice that a situation exists which requires additional traction for the vehicle.

An important object of the instant invention is the provision of a traction device which is adjustable to fit wheels of different sizes, whereby the device can be used with different vehicles and is therefore not limited in its use to a single vehicle.

Another object of the present invention is to provide a traction device which can provide different degrees of traction for a vehicle when more or less traction force is required in a particular situation.

Yet another object of the invention is to provide a traction device which can be readily attached to the rotatable hub of a vehicle and which may operate as a jack for the wheel adjacent thereto when the wheel is to be repaired or replaced, or as a support for the vehicle when the wheel is damaged or otherwise ineffective to support the vehicle so that the latter can continue to be driven even though the wheel is in such a condition.

A further object of the invention is to provide a traction device which can be readily attached adjacent either a front wheel or a back wheel of a vehicle with no modification to the vehicle itself so that a number of such devices are interchangeable between the wheels of a vehicle.

In the drawings:

FIG. 2 is a cross-sectional view taken along line 2—2 of FIG. 1;

FIG. 7 is a schematic plan view of a vehicle illustrating the operative position of the traction member of the present invention and the means remote from the device for actuating the same;

FIG. 8 is a fragmentary plan view of a pedal coupled to a hydraulic master cylinder secured to the fire wall of a vehicle and the ratchet structure for releasably locking the pedal in any one of a number of various operative positions; and FIG. 9 is a side elevational view of the structure illustrated in FIG. 8.

Figure 3:
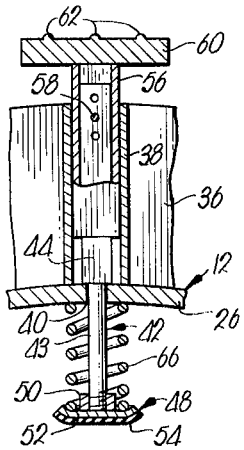
FIG. 3 is an enlarged, cross-sectional view of a portion of the traction device showing one embodiment of a ground-engaging traction member in its normal and retracted position with respect to the frame on which it is mounted.

The instant invention provides a traction device which may be releasably attached to a rotatable hub of a vehicle adjacent the wheel thereof for rotation with the wheel itself. The traction device is comprised of a circular frame having a number of circumferentially spaced, plunger-type, ground-engaging traction members which are radially shiftable so as to move into and out of ground-engaging positions with respect to the frame. A pressure member is coupled to an actuating unit and disposed for successively engaging the traction members as the latter rotate with the frame so as to force the traction members radially outwardly as the same approach the ground. The traction members will, therefore, be moved into engagement with the ground to provide traction for the vehicle. The pressure member is of a configuration to permit the traction members to be retracted after the latter have moved out of engagement with the ground.

The actuating unit may be of any suitable form, but a preferred actuating unit is hydraulic in nature and is operated from a remote location such as the driver's seat of a vehicle, by a pedal or lever coupled with a master cylinder. Means is provided for releasably maintaining the lever in any one of a number of fixed locations so that the pressure member may apply different pressures to the traction members. As a result, the traction device of the present invention is capable of providing different degrees of traction for a vehicle to which it is attached.

The traction device 10 of the present invention includes a frame 12 having a plurality of ground-engaging traction members 14 thereon which move into coupled relationship with an actuating unit 16 when members 14 move downwardly and toward the ground 18 therebelow. Frame 12 is releasably coupled to the rotatable hub 20 of a vehicle having a stationary axle 22 and a wheel 24 rotatable with hub 20 on axle 22. As traction members 14 engage the ground they provide traction for the vehicle and this traction may augment or completely replace the traction provided by wheel 24.

Figure 1:
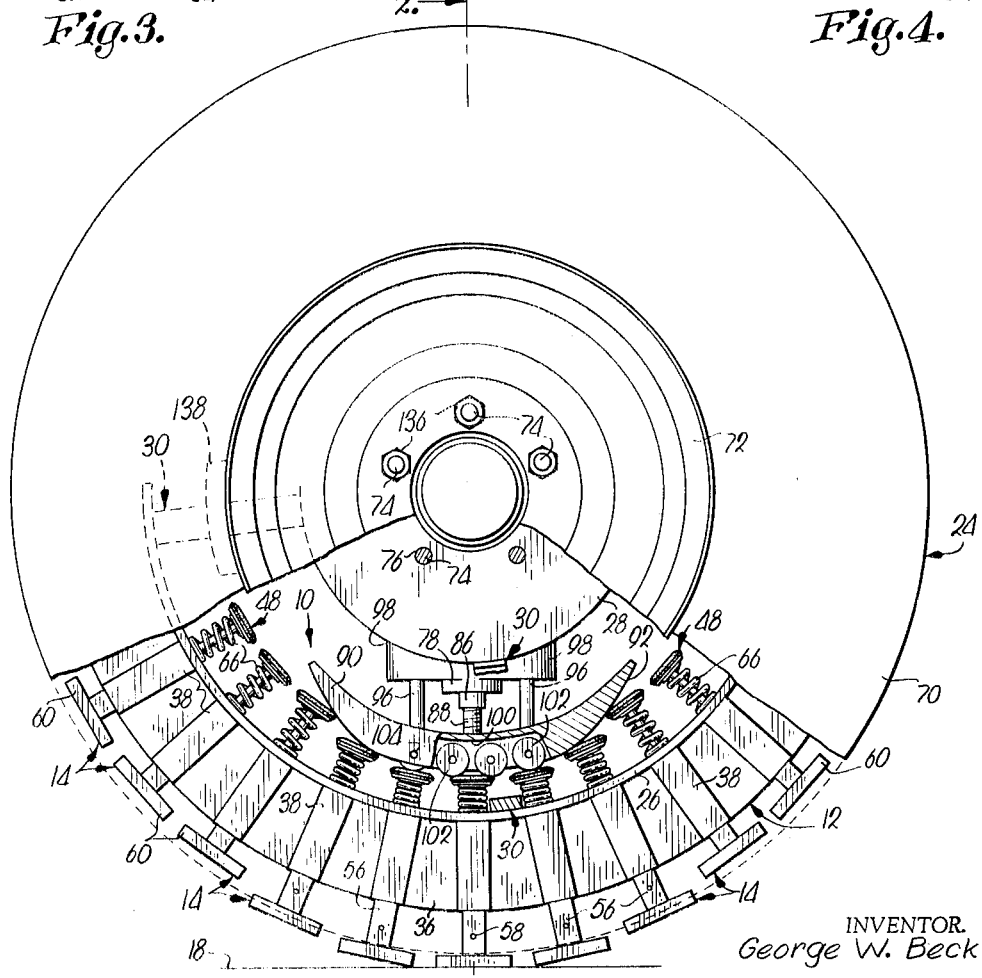
FIGURE 1 is a side elevational view of a wheel of a vehicle with the traction device of the present invention coupled therewith and disposed in an operative position with respect to the ground therebeneath, parts being broken away to illustrate details of the traction device.

Frame 12 includes a continuous ring 26 having a diameter greater than the diameter of hub 20, a disc 28 having a diameter substantially equal to that of hub 20, and a number of irregularly shaped braces 30 for interconnecting ring 26 and disc 28. As shown in FIG. 2, each brace 30 has a section 32 which extends substantially laterally from one face of disc 28, and a section 34 which extends laterally from the outer end of section 32. Section 34 is rigid to ring 26. This construction assures that the plane of disc 28 is spaced from the plane of ring 26 so that device 10 will be out of the plane of wheel 24. An annular, ring-like support 36 is rigid to and extends outwardly of ring 26 as shown in FIGS. 1 and 2. The radius of the outer periphery of support 36 is less than the normal radius of wheel 24. Each traction member 14 is mounted on support 36 by a tube 38 having a length substantially equal to the width of support 36 as shown in FIG. 3. Tube 38 is rigid to ring 26 and one face of support 36 and is substantially radial to the central axis of ring 26.

Tube 38 is concentric with an opening 40 in ring 26, opening 40 being disposed to receive the reduced end portion 43 of a shank 42 having an enlarged portion 44 telescoped within tube 38. Portion 43 is shiftable through opening 40 so that portion 44 may move radially with respect to ring 26 and outwardly thereof. The junction between the reduced and enlarged portions of shank 42 defines a shoulder 46 which limits the radially inward travel of shank 42.

A plate-like element 48 carries an internally threaded sleeve 50 threaded on the radially innermost end of shank 42. Element 48 includes a base section 52 of a rigid material, preferably of a suitable metal. Section 52 is coated with a wear-resistant material, such as rubber or the like, to form a coating 54 therefor.

A sleeve 56 is telescoped in tube 38 and telescopically receives portion 44 of shank 42. As shown in FIG. 3, sleeve 56 is transversely polygonal and is complementally received within tube 38, the latter also being transversely polygonal. Thus, sleeve 56 cannot rotate with respect to tube 38. Sleeve 56 is adjustably mounted on portion 44 by means of a pin 58 which is removably received within aligned openings in portion 44 and sleeve 56. Thus, sleeve 56 may be positioned in any one of a number of positions on portion 44 with respect to shoulder 46.

Figure 6:
FIG. 6 is a view similar to FIG. 5 but showing another embodiment of the ground-engaging portion of a traction member.
Figure 5:
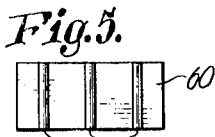
FIG. 5 is a plan view of one embodiment of the ground-engaging portion of a traction member and illustrating the projections or bosses thereon which penetrate snow and ice, for instance, to provide traction for the vehicle.

A rigid, flat traction plate 60 is secured to the outer end of sleeve 56 and the outer face of plate 60 is provided with a number of parallel bosses or projections 62 as shown in FIGS. 3 and 5. Plate 60 may have a longitudinally extending boss 64 as shown in FIG. 6 in lieu of bosses 62. Bosses 62 are generally used when device 10 is mounted on a rear wheel of a vehicle, whereas boss 64 is used when device 10 is mounted on a front wheel of a vehicle.

The construction shown in FIG. 3 permits sleeve 56, and thereby plate 60, to shift radially outwardly with respect to frame 12 so that plate 60 will engage the ground if the latter is shifted a sufficient distance radially of the central axis of frame 12.

Sleeve 56, and thereby plate 60, are biased radially inwardly of frame 12 by a coil spring 66 disposed about shank 42 and between element 48 and ring 26. When force is applied to shank 42 to shift it radially outwardly, spring 66 becomes compressed and returns shank 42 to its initial position when the force is removed therefrom.

Figure 4:
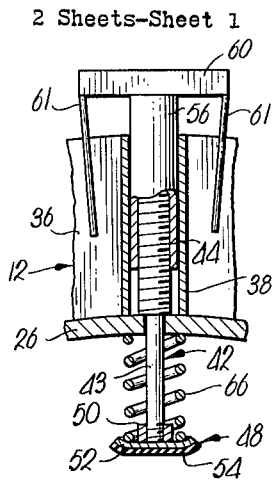
FIG. 4 is a view similar to FIG. 3 but illustrating another embodiment of a traction member which engages the ground to provide traction for a vehicle.

An alternate way of adjustably mounting plate 60 on frame 12 is shown in FIG. 4 wherein all of the parts are the same as the corresponding parts illustrated and described in FIG. 3 except that sleeve 56 and tube 38 are cylindrical, the inner surface of sleeve 56 is threaded, and portion 44 is threadably received within sleeve 56. Thus, plate 60 is adjustably disposed in an initial position by rotating shank 42 relative to sleeve 56. To prevent rotation of sleeve 56 as shank 42 is rotated, and as plate 60 reciprocates, a pair of rod-like guides 61 is provided, guides 61 being rigid to the inner face of plate 60 and normally in sliding engagement with the corresponding face of support 36.

Frame 12 is mounted on hub 20 by receiving the threaded studs 74 projecting laterally from the outer face of hub 20 in holes 76 provided in disc 28. Ring 26 and support 36 will then be disposed in a plane offset from the plane of wheel 24 as shown in FIG. 2, and members 14 will reciprocate radially without interference from wheel 24.

Actuating unit 16 includes a cylinder 78 having an extension 80 integral therewith and projecting laterally therefrom for connection with the vehicle at any suitable location thereon to mount cylinder 78 in a stationary position within the vertical plane of frame 12. For purposes of illustration only, extension 80 is, as shown in FIG. 2, releasably secured to the U-bolts 82 which secure a leaf spring 84 to axle 22. Cylinder 78 is thus coupled to axle 22 with the central axis of cylinder 78 being radially disposed relative to axle 22 and positioned substantially in the plane of frame 12. It is clear that extension 80 could be coupled to other structural parts of the vehicle without departing from the scope of the invention.

Cylinder 78 has a piston (not shown) therein which is coupled with a cap or sleeve 86, cap 86 being threadably mounted on a shaft 88 rigid to and projecting normally upwardly from an elongated pressure member 90 having a cam surface 92. A hydraulic line 94 communicates with the upper end of the chamber in cylinder 78 for directing fluid under pressure into said chamber. This action forces the piston downwardly to in turn urge member 90 in the same direction. As the fluid pressure is removed from the cylinder chamber, a partial vacuum is created therein to assist in urging the piston and thereby pressure member 90 upwardly. To prevent rotation of pressure member 90 about shaft 88 as pressure member 90 is shifted in either direction, a pair of guide rods 96 is shiftably received within bores (not shown) in the undersides of a pair of bosses 98 integral with and extending outwardly from cylinder 78 in opposed directions as shown in FIG. 1.

Pressure member 90 is provided with a recess 100 in surface 92 thereof, and a number of rollers 102 are disposed within recess 100 and are rotatably mounted on pressure member 90 by means of pins 104. Rollers 102 extend outwardly from recess 100 and provide antifriction means for a purpose to be described.

When fluid is directed into cylinder 78, pressure member 90 is forced downwardly and into the path of rotation of members 14 to successively urge the latter radially outwardly of frame 12 and thereby downwardly into engagement with the ground therebelow. FIG. 7 illustrates schematically the use of a pair of devices 10 at the rear of a vehicle 106 adjacent the rear wheels 108 thereof. It is to be emphasized however, that devices 10 can be utilized with all four wheels of a vehicle, or with the front wheels alone, as well as with the back wheels alone.

A hydraulic line 110 communicates with the lines 94 of devices 10 of FIG. 7 and is also coupled with a master cylinder 112 mounted on the fire wall 114 adjacent the front end of vehicle 106. As shown in FIGS. 8 and 9, a rod 116 is coupled with master cylinder 112 to apply fluid under pressure to lines 94 and thereby cylinders 78 of devices 10.

One end of rod 116 is pivotally secured by a pin 118 to a lever 120 having a foot pedal 122 on one extremity and pivotally mounted at the other extremity on an ear 124 rigid to fire wall 114. Rod 116 carries a first horizontally disposed sawtooth or ratchet member 126 thereon which, when rod 116 is forced inwardly under the action of lever 120, becomes intercoupled with a second horizontally disposed sawtooth member or ratchet 128 rigid to and extending longitudinally of a bar 130 pivotally mounted by means of an ear 132 on fire wall 114 for rotation about a vertical axis. A coil spring 134 secured at one end to bar 130, and at the other end to vehicle 106, biases bar 130 toward rod 116.

Thus, when lever 120 is rotated in a clockwise sense when viewing FIG. 9, rod 116 is forced inwardly to cause fluid under pressure to be directed into lines 94. At the same time, member 126 becomes coupled with member 128 so that rod 116 is releasably maintained in a predetermined position. Fluid pressure will thus be maintained in lines 94. A greater pressure will be applied to lines 94 if rod 116 is forced further inwardly and members 126 and 128 are again interlocked or intercoupled.

To cause rod 116 to return to its equilibrium or inoperative position, bar 130 is swung away from rod 116 and members 126 and 128 becomes uncoupled from each other. The fluid pressure in master cylinder 112 is sufficient to force rod 116 outwardly therefrom.

*Operation*

Device 10 is secured in the operative position thereof shown in FIG. 2 by first removing wheel 24 from hub 20. This requires that nuts 136, which secure rim 72 to studs 74, be removed so that wheel 24 may be removed from hub 20. With wheel 24 removed, cylinder 78 may be affixed to the vehicle in the proper position before frame 12 is attached to hub 20. With cylinder 78 in place, disc 28 is disposed on hub 20 with studs 74 received in holes 76. Frame 12 will then be properly aligned with pressure member 90 beneath cylinder 78. Wheel 24 is then placed onto hub 20 in the usual manner and nuts 136 are tightened to secure frame 12 and wheel 24 in place.

To properly position rim 72 and to stabilize the same with respect to frame 12, a number of arcuate, rim-engaging elements 138 are adjustably carried on braces 30 as shown in FIGS. 1 and 2. Elements 138 are adjustable to adapt frame 12 to rims of different sizes.

With device 10 and wheel 24 in an operative position, line 94 is coupled with the master cylinder located at any suitable station, preferably on the fire wall of the vehicle as illustrated in FIGS. 7-9. Rod 116, when actuated by foot pedal 122, will supply fluid under pressure to cylinder 78.

It is to be understood that sleeves 56 of members 14 will have been adjusted to the desired positions relative to ring 26. For instance, if the construction of FIG. 3 is utilized, sleeves 56 will be adjusted by placing the corresponding pins 58 through the proper aligned openings in sleeve 56 and portions 44 of shanks 42. If the construction of FIG. 4 is utilized, portions 44 will be threaded into the corresponding sleeves 56 to a greater or lesser degree. These adjustments are made depending upon the diameter of the tire 70 which is utilized on rim 72. For a tire having a greater diameter, sleeves 56 and thereby plates 60, will be initially disposed outwardly of frame 12 a greater distance than if the tire has a lesser diameter.

Another adjustment which is initially to be made before operation of device 10 is the adjustment of shaft 88 with respect to cap 86. This adjustment is to be made depending upon the diameter of the rim 72 which is utilized. Thus, for rims of greater diameter, pressure member 90 will be disposed in an initial position radially outwardly of a corresponding position for a rim having a lesser diameter.

After the aforesaid adjustments have been made, device 10 is ready for use. As wheel 24 rotates, it is evident that frame 12 will also rotate therewith. So long as pressure member 90 is in a retracted, inoperative position, i.e., no fluid pressure exerted on the piston in cylinder 78, traction members 14 will rotate with frame 12 and will not be urged radially outwardly by pressure member 90 so as to contact the ground therebeneath. Springs 66 will be in their normal, uncompressed conditions, and plates 60 will be within the dashed line 68 denoting the outer periphery of tire 70. Traction for the vehicle will be provided solely by wheel 24.

When the vehicle is to be driven over snow and ice for instance, and additional traction for the vehicle is desired, foot pedal 122 is depressed to force rod 116 toward master cylinder 112. Thereupon, fluid under pressure is delivered to cylinder 78 to force pressure member 90 downwardly and into the path of travel of the rotating elements 48 of members 14. Regardless of the direction of rotation of wheel 24 and thereby frame 12, elements 48 will successively engage surface 92 of pressure member 90 and will be cammed radially outwardly a distance depending upon the location of pressure member 90 with respect to cylinder 78.

As shown in FIG. 1, pressure member 90 is in an operative position so that springs 66 of the various members 14 are compressed and plates 60 have been moved outside line 68 and into contact with the ground 18 therebelow. As frame 12 continues to rotate with wheel 24, members 14 will continue to move past pressure member 90. Elements 48 will successively pass beneath and engage rollers 102 and, after leaving the last roller 102, will engage the corresponding end stretch of surface 92. Thus, members 14 will progressively be urged radially outwardly of frame 12 upon contact with one end stretch of surface 92 and will be progressively allowed to move radially inwardly under the action of springs 66 when in contact with the opposite end stretch of surface 92. The presence of rollers 102 eliminates any substantial wear of elements 48 as the same pass beneath pressure member 90. Since elements 48 are rounded at the extremities thereof, there will be no substantial damage thereto as the same initially contact and finally move away from surface 92.

The distance through which members 14 are urged radially outwardly will, of course, be determined by the fluid pressure exerted on the piston within cylinder 78 and ultimately by the distance through which rod 116 travels when shifted by lever 120. For greater pressures exerted on pressure member 90 and thereby exerted on members 14, rod 116 will have moved toward master cylinder 112 a greater distance and this pressure of course, will be maintained by the interlocking or intercoupling of members 126 and 128.

If projections 62 are used on plate 60, positive traction is assured for the vehicle inasmuch as these projections "bite" into snow or ice. For the rear wheels of a vehicle, the transversely disposed projections 62 increase the frictional force between the snow and ice and plates 60. The longitudinal disposed bosses 64 on plates 60 are especially suitable for use on the front wheels of a vehicle because such projections prevent any tendency for the vehicle to move laterally.

When it is desired to render device 10 inoperative, the operator of the vehicle swings bar 130 away from rod 116 and the latter is returned to its initial position inasmuch as member 126 becomes disengaged from member 128. The fluid pressure is removed from within cylinder 78 and the rotating members 14 then serve to urge pressure member 9 upwardly and into its initial or inoperative position. The partial vacuum formed in cylinder 78 by the removal of fluid pressure therefrom also assists in raising pressure member 90 out of its operative position illustrated in FIG. 1.

Device 10, therefore, increases the traction for the vehicle to which it is attached during periods when wheel 24 is rendered less effective or totally ineffective as a traction producer. It is evident that device 10 may be permanently secured to the wheel of a vehicle and may be placed in operation as a moment's notice by merely applying pressure to foot pedal 122 to force rod 116 inwardly with respect to master cylinder 112. Device 10 may also be deactivated almost instantaneously by simply swinging bar 130 in the proper direction.

In addition to providing traction for a vehicle, device 10 may be utilized as a jack to elevate the wheel or hub adjacent thereto a distance sufficient to permit removal of the wheel 24 therefrom. For instance, if tire 70 becomes punctured and is deflated, device 10 can be operated so that wheel 24 can be removed from hub 20. If tire 70 becomes deflated while the vehicle is moving, device 10 will assure that the vehicle is not supported by the deflated tire because the traction members 14 will engage the ground after tire 70 has been deflated to a predetermined degree.

It is evident further that device 10 can be used to support the vehicle if, at any time, the adjacent wheel 24 becomes ineffective to accomplish this function. For instance, during highway driving and when tire 70 is flat, the vehicle can continue to be moved until a service station or like facility is reached because device 10 can support the vehicle during normal driving operations thereof.

Device 10 may be removed from one vehicle, adjusted with respect to the positions of plates 60 and pressure member 90, and then attached to another vehicle having different tire and rim sizes without further modification thereto. Device 10 can, therefore, be universally applied to different types of vehicles and its use is not restricted to one or a limited number of vehicles.

Device 10 eliminates having to put tire chains on the rear wheels of an automobile for instance, and the user of device 10 is not at any time subjected to the dirt on or about the wheel adjacent which device 10 is utilized.

Changes in traction device 10 may be made without departing from the spirit of the invention. For instance, other types of actuating units 16 may be utilized in lieu of a hydraulic system as illustrated and described herein. A pneumatic piston and cylinder assembly may be utilized and operated in the same manner with lever 120. A source of air under pressure would then be utilized and it is conceivable that the source may be maintained at a predetermined pressure in much the same way as the tires of a vehicle. The vehicle need only be driven into a service station or the like and the facility for inflating tires could be used to inflate or bring the air source of device 10 up to a predetermined pressure.

Actuating unit 16 may be electrical in nature, utilizing a solenoid for shifting pressure member 90 downwardly into its operative position. The solenoid could be actuated by a switching device mounted on the dashboard of an automobile, for instance. The electrical system of the automobile could be utilized to supply power for the solenoid.

Although rollers 102 have been described as being mounted on pressure member 90, it is clear that a roller could be provided for each traction member 14 and used in lieu of the corresponding element 48. Thus, rollers 102 projecting outwardly from surface 92 would not be necessary, and the rollers on the traction members 14 would engage surface 92, the latter of course, being substantially continuous with no recess therein, such as recess 100.

By constructing pressure member 90 in the manner described above, traction members 14 extend radially outwardly of frame 12 only during the time when the same are adjacent the ground. Traction members 14 retract into their inoperative positions by springs 66 and thus do not interfere with the adjacent structure of the vehicle to which device 10 is attached. This feature makes device 10 suitable for use on the front or back wheels of a vehicle.

Having thus described the invention, what is claimed as new and desired to be secured by Letters Patent is:

1. A traction device for attachment to a vehicle having a rotatable hub and a ground-engaging wheel mounted on the hub for rotation therewith, said device comprising:
   a frame;
   means for coupling the frame with the hub of a vehicle adjacent the wheel thereof for rotation therewith;
   a plurality of elongated traction members each including a pair of relatively shiftable parts having means thereon releasably interconnecting said pair of parts to maintain the latter against movement of one part relative to the other part, whereby said pair of parts may be disposed in any one of a number of operative positions and the corresponding traction member is permitted to be adjusted in length;
   means mounting said traction members in spaced relationship on said frame for longitudinal movement outwardly of the axis of rotation of the frame and into respective positions disposed a distance from said axis greater than the radius of said wheel;
   a pressure member;
   means secured to the pressure member for shiftably mounting the latter on said vehicle, said pressure member being shiftable into a location at which said pressure member successively engages said traction members and thereby urges the latter into said positions when the traction members are adjacent the ground and as said frame rotates;
   a power unit having means for mounting the same on said vehicle; and
   means adjustably securing said pressure member to said power unit, the latter being disposed for shifting the pressure member from any one of a number of initial dispositions into said location, whereby the traction members will be caused to successively engage the ground and thereby provide traction for said vehicle.

2. A traction device for attachment to a vehicle having an axle, a rotatable hub in the axle and a ground-engaging wheel mounted on the hub for rotation therewith, said device comprising:

an annular frame having a diameter less than the diameter of said wheel and provided with means thereon for mounting it on said hub for rotation with said wheel;

a plurality of traction members;

means mounting said traction members in circumferentially spaced relationship on said frame for movement radially of the axis of rotation thereof and into and out of respective positions disposed a distance from said axis greater than the radius of the wheel;

an elongated pressure member;

means secured to said pressure member for mounting the same on said vehicle for rectilinear movement downwardly of said axis and into a location at which the pressure member successively engages the traction members and urges the latter into said positions as said traction members rotate with said frame and as the traction members approach the ground; and means coupled with said pressure member below and vertically aligned with said axle for moving the latter into and releasably maintaining the same at said location, whereby the traction members will be caused to engage the ground and thereby provide traction for said vehicle, said pressure member moving and maintaining means including a fluid piston and cylinder assembly, a source of fluid coupled with said assembly and means for directing a supply of fluid under pressure from said source to the cylinder of said assembly, and including guide means holding the pressure member against rotation about a vertical axis, said directing means including a lever adapted to be mounted on said vehicle at a location remote from said frame, and means coupled with the lever for releasably maintaining the latter in any one of a number of operative positions, whereby fluid under different pressures may be directed into the cylinder of said assembly and thereby said pressure member may be maintained at its location at said different pressures.

3. A traction device for attachment to a vehicle having a rotatable hub and a ground-engaging wheel mounted on the hub for rotation therewith, said device comprising:

an annular frame having a diameter less than the diameter of said wheel and provided with means thereon for mounting it on said hub for rotation with said wheel;

a plurality of traction members;

means mounting said traction members in circumferentially spaced relationship on said frame for movement radially of the axis of rotation thereof and into and out of respective positions disposed a distance from said axis greater than the radius of the wheel, each of said traction members including a pair of elongated, radially disposed, relatively telescoped parts, each part having a number of holes therethrough, the holes of one part being alignable with the holes of the other part, and a pin removably disposed in a pair of aligned holes, whereby to adjustably interconnect said parts to permit variations in the length of the traction member;

an elongated pressure member;

means secured to said pressure member for mouting the same on said vehicle for movement downwardly of said axis and into a location at which the pressure member successively engages the traction members and urges the latter into said positions as said traction members rotate with said frame and as the traction members approach the ground; and means coupled with said pressure member for moving the latter into and releasably maintaining the same at said location, whereby the traction members will be caused to engage the ground and thereby provide traction for said vehicle.

References Cited by the Examiner

UNITED STATES PATENTS

| 1,228,895 | 6/1917 | Foecke | 301—48 |
| 1,787,608 | 1/1931 | Ansell | 301—47 X |
| 2,924,486 | 2/1960 | Blashke | 301—48 |
| 1,269,182 | 6/1918 | Hollis. | |
| 3,016,270 | 1/1962 | Tucker | 301—48 |

FOREIGN PATENTS

| 490,891 | 3/1953 | Canada. |
| 866,615 | 2/1953 | Germany. |

A. HARRY LEVY, *Primary Examiner.*

ARTHUR L. LA POINT, *Examiner.*